United States Patent [19]
Hansen

[11] 3,827,758
[45] Aug. 6, 1974

[54] BRAKE SYSTEM
[75] Inventor: Howard C. Hansen, Battle Creek, Mich.
[73] Assignee: Clark Equipment Company, Buchanan, Mich.
[22] Filed: Dec. 18, 1972
[21] Appl. No.: 315,943

[52] U.S. Cl................ 303/3, 188/156, 303/10, 303/13, 303/20, 338/108
[51] Int. Cl.............................. B60t 13/74
[58] Field of Search............. 303/3, 4, 7, 15, 13, 2, 303/20, 50–54; 188/3, 158, 156, 162; 338/99, 108

[56] References Cited
UNITED STATES PATENTS

| | | |
|---|---|---|
| 2,454,291 | 11/1948 | Penrose ............................... 303/15 |
| 3,398,992 | 8/1968 | Littmann ............................. 303/15 |
| 3,507,542 | 4/1970 | Cannella ............................ 188/3 R |

*Primary Examiner*—Trygve M. Blix
*Assistant Examiner*—D. C. Butler
*Attorney, Agent, or Firm*—John C. Wiessler

[57] ABSTRACT

A brake system particularly for electric vehicles which provides power assisted hydraulic brakes in which the degree of power assistance is regulated for the braking force desired by the use of an operator compressible carbon pile in the circuit of an electric motor which drives a pump to vary the pressure in a master cylinder. In the event of any breakdown or malfunction for any reason in the power assist portion of the system the carbon pile may function as a compressible mechanical link between the hydraulic brakes and the foot pedal for manually applying the brake.

8 Claims, 1 Drawing Figure

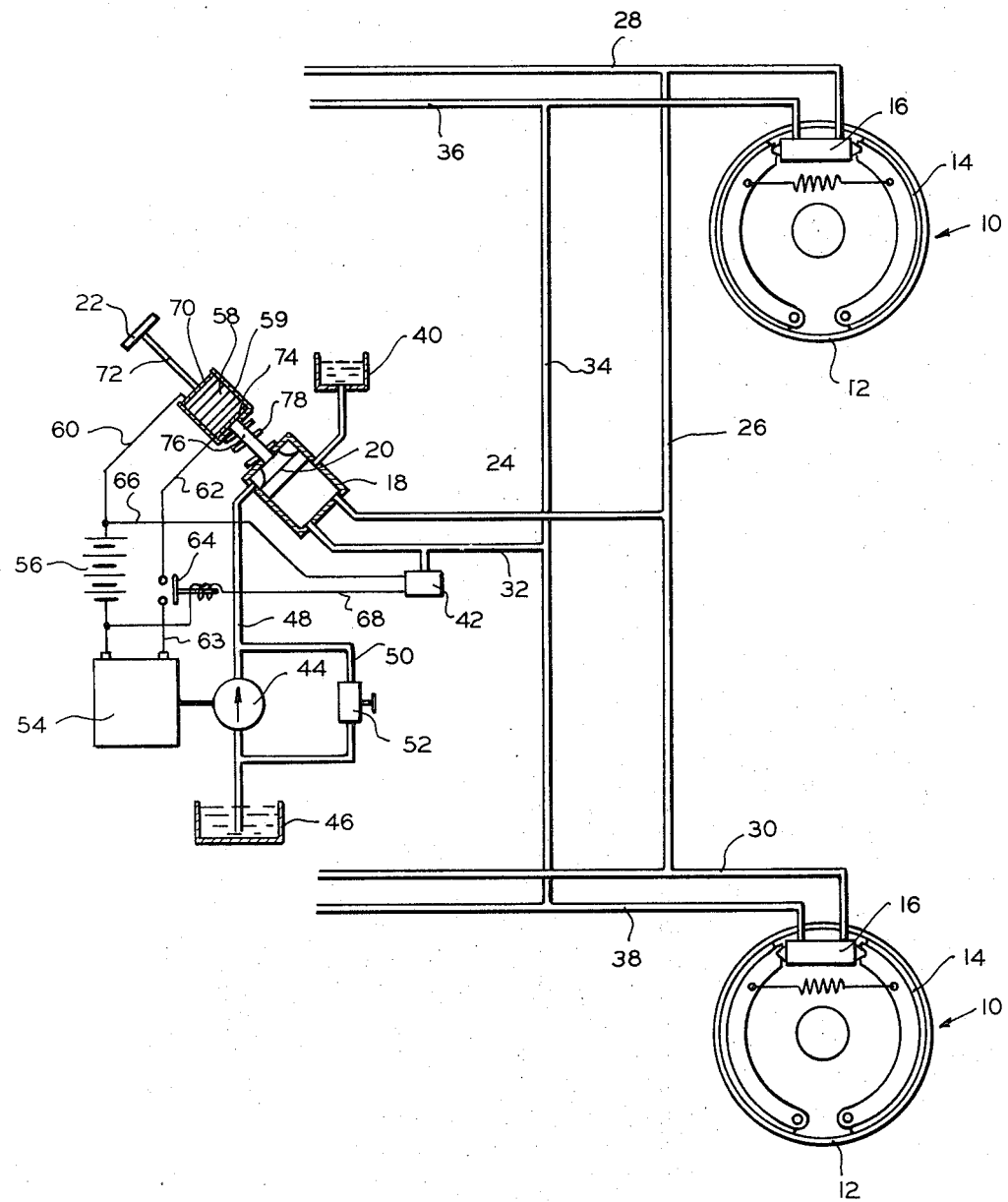

BRAKE SYSTEM

BACKGROUND OF THE INVENTION

The field of art to which the invention pertains includes vehicle brakes.

A problem inherent in providing power brakes for an electrical vehicle results from the fact that the vehicle has no engine accessory drive means or vacuum source of power for braking, such as is common in combustion engine driven vehicles. Although electro-magnetic brake systems are highly developed, such systems do not generally provide a manual back-up brake in the event of failure of the electro-magnetic brakes, so that an emergency hand-operated parking brake is frequently used for that purpose.

SUMMARY

My invention provides a fluid power brake which is energized through an electric drive circuit which includes a manually compressible carbon pile for varying the braking force by varying the resistance to current flow in the drive circuit. The carbon pile provides a direct mechanical link between the operator and the brake so that in the event of power failure for any reason the brake may be directly manually applied through the compressible carbon pile.

It is a primary object of the invention to provide a fluid power brake for electric vehicles having the same means functionable both as an electric and as a mechanical control for varying braking power.

Another object of the invention is to provide an electric actuated fluid brake system of structural simplicity and reliability both as a power brake and as an emergency manual brake.

DESCRIPTION OF THE PREFERRED EMBODIMENT

The single FIGURE shows schematically a preferred embodiment of my invention in a brake system wherein a plurality of conventional internal expanding shoe type brakes 10, a pair of which are shown, each includes a drum 12 and a pair of brake shoes 14, between which a hydraulic actuator 16 is supplied with pressurized hydraulic fluid. The actuator 16 when extended forces shoes 14 outwardly into frictional engagement with the drums, thereby applying the brakes.

The brake system also includes a conventional master cylinder 18 having a piston 20 operated by a foot pedal 22 and/or by hydraulic power assist means to be described. The master cylinder is connected below piston 20 to each actuator 16 by conduits 24, 26, 28, 30, and 32, 34, 36, 38, in known manner. The master cylinder 18 is connected also at a point below piston 20 to a make-up fluid reservoir 40, as is usual, and to a pressure switch 42.

Master cylinder 18 is preferably fluid connected above piston 20 to a fixed displacement pump, such as a gear pump 44, which is connected to a fluid reservoir 46 and to the cylinder 18 by a conduit 48, having an adjustable bypass conduit and valve 50 and 52, and adapted to be driven by an electric motor 54.

Motor 54 is driven in a series circuit which includes a battery 56, a plurality of carbon disc elements which form a compressible pile 58 located within a housing 59, and connecting lines 60, 62 and 63. A contactor switch 64 operates in lines 62 and 63 and is operated by a pressure switch 42 which is connected across the battery by lines 66 and 68.

Brake pedal 22 is connected to a disc-shaped pressure plate 70 by a rod 72 and is thereby adapted to actuate axially of housing 59 the pile 58 to vary the compression thereof and therefore the electrical resistance in a well-known manner. The opposite end of the carbon pile is supported from a disc-shaped plate 74 which rigidly abuts the closed end of cylinder 59 and which is connected to piston 20 by a piston rod 76. A spring 78 is mounted between master cylinder 18 and housing 59 and urges the piston 20 outwardly of cylinder 18 with housing 59 and the carbon pile to a non-braking position, as shown. The carbon pile is connected electrically in circuit by connection of line 60 to plate 70 and line 62 to plate 74. As is well-known, the electrical resistance of a carbon pile is inversely proportional to compressive force, so that as pile 58 is compressed the electrical resistance thereof decreases causing a proportionate increase in the current flow through motor 54.

In operation, actuation of brakes 10 occurs upon operator depression of foot pedal 22 to compress the carbon pile 58. This initially tends to actuate piston 20 inwardly of cylinder 18 to pressurize the brake system, and to close pressure switch 42 which thereby closes the circuit between line 66 and 68 causing contactor 64 to close the open circuit in lines 62 and 63 and through the carbon pile. Motor 54 and pump 44 are thereby operated to pressurize the rod side of piston 20 to provide power assistance in braking.

The purpose of using pressure switch 42 to operate contactor 64 is to prevent any current drain which might occur through the carbon pile when the brake is not in use, although, if desired, the pressure switch and contactor can be eliminated and a continuous connection provided between lines 62 and 63.

Adjustable valve 52 in bypass conduit 50 provides means for varying the effective leak rate of pump 44, since the output of the pump dead-ends in cylinder 18, and the leakage rate will allow the motor to rotate slowly. The leakage rate may be varied as required to effect a desired distribution of generated heat to the commutator segments of the motor, as well as to provide for a prompt dissipation of pump discharge pressure when the motor stops upon removal of control pressure from pedal 22, thus releasing the brakes quickly. Each time piston 20 is fully retracted, as shown, reservoir 40 replenishes any fluid shortage in the brake system.

If for any reason a breakdown in the power assist portion of the brake system occurs, either electrical or hydraulic, the brakes may be manually applied simply by operator compression of the carbon pile which then mechanically actuates piston 20 to apply the brakes without power assist. Thus, the carbon pile functions both as a mechanical link in a manually applied main brake system and as a variable resistance control in the electric drive circuit power assist portion of the system.

Although I have described and illustrated a preferred embodiment of my invention, it will be understood by those skilled in the art that modifications may be made in the structure, form, and relative arrangement of parts without necessarily departing from the spirit and scope of the invention. Accordingly, it should be understood that I intend to cover by the appended claims all such modifications which fall within the scope of my invention.

I claim:

1. A brake system for electric vehicles comprising a master fluid cylinder means operatively connected to fluid brake means, a compressible carbon pile applying mechanically a braking force to said cylinder means, fluid pressure generating means for applying hydraulically a braking force to said cylinder means, and electric power circuit means which includes said carbon pile for operating said pressure generating means.

2. A brake system as claimed in claim 1 wherein said electric power circuit means includes an electric motor for driving said pressure generating means, said carbon pile being adapted to vary the resistance in the power circuit means to vary the braking force.

3. A brake system as claimed in claim 2 wherein said pressure generating means is a positive displacement pump, and means for adjusting the leakage rate of said pump which permits a corresponding slow operation of said electric motor when said carbon pile applies braking force.

4. A brake system as claimed in claim 1 wherein said carbon pile is an electrical conductor having an operator regulated resistance.

5. A brake system as claimed in claim 1 wherein switch means is activated upon operation of said carbon pile for activating said electric power means.

6. A brake system for electric vehicles comprising hydraulic means for applying the brakes which includes a master cylinder, a hydraulic pump connected thereto and a pump activating means including an electric drive circuit having an electrical control means operative to control the pump, and a manually actuated mechanical control also connected to the master cylinder for applying directly thereto a mechanical braking force, which mechanical control includes said electrical control means.

7. A brake system as claimed in claim 6 wherein said electrical control means is a compressible carbon pile activated by the operator for varying the resistance in said drive circuit as a function of the manual force applied thereto whereby to increase the hydraulic pressure in said master cylinder directly as a function of the compressive force applied to said carbon pile.

8. A brake system as claimed in claim 7 wherein in the event of malfunction of the hydraulic pump or electric drive circuit said carbon pile functions in said mechanical control as a mechanical link to manually apply the brakes through the master cylinder.

* * * * *